UNITED STATES PATENT OFFICE.

EDUARD MÜNCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

4.4'-DIBROM-DIPHENYL-DISULFID-2.2'-DICARBOXYLIC ACID AND PROCESS OF OBTAINING SUCH BODIES.

1,003,289.     Specification of Letters Patent.     Patented Sept. 12, 1911.

No Drawing.     Application filed November 9, 1908. Serial No. 461,783.

*To all whom it may concern:*

Be it known that I, EDUARD MÜNCH, doctor of philosophy and chemist, subject of the Grand Duke of Baden, residing at Ludwigshafen-on-the-Rhine, Germany, have invented new and useful Improvements in 4.4' - Dibrom-Diphenyl-Disulfid-2.2' - Dicarboxylic Acid and Processes of Obtaining such Bodies, of which the following is a specification.

I have discovered a new body suitable for the manufacture of coloring matters which is chemically a 4.4'-dibrom-diphenyl-disulfid-2.2'-dicarboxylic acid, and to obtain my new body I have discovered a new process which can also be applied by the production of analogous bodies. I have discovered that by reacting with a solution of a sulfantimoniate, sulfarsenate, or sulfostannate or an orthodiazobenzoic acid compound, under which term I include orthodiazo-benzoic acid itself, or a homologue, or an analogue, thereof, or a derivative of either of these compounds, the corresponding diphenyl-disulfid-2.2'-dicarboxylic acid compounds are obtained in a pure condition, the yield being almost quantitative. Apparently intermediate compounds containing both sulfur and a diazo group are formed, but these are very unstable and immediately begin to split up, giving rise to the diphenyl-disulfid-2.2'-dicarboxylic acid compounds. For the purpose of this invention a sulfarsenate and a sulfostannate are equivalents of a sulfantimoniate. Upon treating the diphenyl-disulfid-2.2'-dicarboxylic acid compounds thus obtained with a reducing agent, the corresponding phenyl - mercaptan - 2 - carboxylic acid compounds can be obtained. The sulfid (for instance the antimony pentasulfid) which is set free during the reaction can be the like, be converted into the sulfo salt which can then be used over again. Better yields have been obtained when using sulfantimoniate according to this invention than have been obtained when using either sulfarseniate or sulfostannate, and the antimony sulfid formed when sulfoantimoniate is used can be more easily recovered than can be the arsenic sulfid or the tin sulfid formed when sulfarseniate or sulfostannate (respectively) is used.

The following is an example of how my invention can be carried into practical effect, but my invention is not confined to this example. The parts are by weight. Dissolve four hundred and thirty-two parts of brom-anthranilic acid—that is, 5-brom-2-amino-benzoic acid,

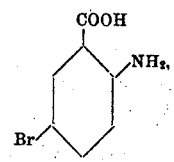

in twenty-four hundred parts of water and two hundred and thirty-five parts of thirty-five per cent. caustic soda solution. Add one hundred and forty-four parts of sodium nitrite and allow the solution to run, while stirring, into a mixture of four hundred and seventy parts of thirty-two per cent. hydrochloric acid and eight hundred parts of ice. Then run the solution of 2-diazo-5-brom-benzoic acid, thus obtained, into a solution of seven hundred parts of Schlippe's salt (sodium sulfantimoniate $Na_3SbS_4.9H_2O$) in five thousand parts of water, maintaining the temperature just below zero centigrade and preferably introducing the diazo solution into the antimoniate solution beneath its surface. Antimony pentasulfid with generally a little antimony trisulfid is set free, nitrogen is evolved, and a yellow solution is formed which should be allowed to stand, at ordinary temperature, for about from two to three hours, until a test portion, on filtering, yields a filtrate which is not yellow. Then acidfy the solution with hydrochloric acid and allow it to stand for about an hour and filter off and wash the orange-yellow precipitate. Then stir this precipitate with about five thousand parts of water, add one hundred and thirty parts of ammonium carbonate and warm on the water-bath until all the 4.4'-dibrom-diphenyl-disulfid-2.2'-dicarboxylic acid is dissolved and filter off the antimony sulfid which remains undissolved. Then acidify the filtrate with hydrochloric acid, whereupon 4.4'-dibrom-diphenyl-disulfid-2.2'-dicarboxylic acid

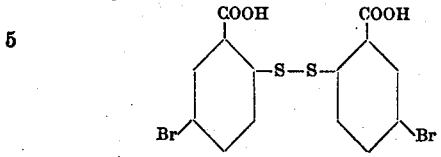

is precipitated in the form of a white precipitate which can be filtered off, washed and dried. The yield is almost quantitative. Since 2-diazo-5-brom-benzoic acid is unstable and should not be kept for any length of time before acting upon it with sodium sulfantimoniate according to this example, I have for the sake of convenience described above how the said diazo compound can be obtained, but the production of the 2-diazo-5-brom-benzoic acid does not form any part of my invention. Similarly I have for the sake of convenience described how the 4.4'-dibrom-diphenyl-disulfid-2.2'-dicarboxylic acid can be isolated after it has been formed, but such isolation does not constitute a part of my invention.

My process can be applied in a similar manner to other derivatives of anthranilic acid besides brom-anthranilic acid and to anthranilic acid itself, such for instance as chlor-anthranilic acid and methyl-anthranilic acid, and in each case the corresponding diphenyl-disulfid-2.2'-dicarboxylic acid compound is obtained.

My new 4.4'-dibrom-diphenyl-disulfid-2.2'-dicarboxylic acid possesses the following properties: It is colorless, melts at about three hundred and eighteen degrees centigrade, and when freshly precipitated from its solutions is easily soluble in acetone and difficultly soluble in alcohol and glacial acetic acid and very difficultly soluble in boiling water.

Now what I claim is:—

1. As a new product 4.4'-dibrom-diphenyl-disulfid-2.2'-dicarboxylic acid which can be obtained by treating diazotized 5-brom-2-amino-benzoic acid with sodium sulfantimoniate and which is colorless, melts at about 310° C., and when freshly precipitated from its solution is easily soluble in acetone and difficultly soluble in alcohol and glacial acetic acid and very difficultly soluble in boiling water.

2. The process of producing 4.4'-dibrom-diphenyl-disulfid-2.2'-dicarboxylic acid compounds by reacting with a sulfantimoniate on a 2-diazo-5-brom-benzoic acid compound.

3. The process of producing a diphenyl-disulfid-2.2'-dicarboxylic acid compound by reacting with a sulfantimoniate on an ortho-diazo-benzoic acid.

In testimony whereof I have hereunto set my hand in the presence of two subscribing witnesses.

EDUARD MÜNCH.

Witnesses:
ERNEST F. EHRHARDT,
JOS. H. LEUTE.